United States Patent [19]

Saidi

[11] Patent Number: 5,770,018
[45] Date of Patent: Jun. 23, 1998

[54] METHOD FOR PREPARING LITHIUM MANGANESE OXIDE COMPOUNDS

[75] Inventor: M. Yazid Saidi, Henderson, Nev.

[73] Assignee: Valence Technology, Inc., Henderson, Nev.

[21] Appl. No.: 630,303

[22] Filed: Apr. 10, 1996

[51] Int. Cl.$^6$ .............................. C07C 1/00; C01D 1/00; C01G 45/12; H01M 4/50
[52] U.S. Cl. ............................... 204/157.15; 204/157.43; 204/157.51; 423/599; 429/224
[58] Field of Search ........................... 423/599; 429/224; 204/157.15, 157.43, 157.51

[56] References Cited

U.S. PATENT DOCUMENTS

| | | | |
|---|---|---|---|
| 4,246,253 | 1/1981 | Hunter | 423/605 |
| 4,828,834 | 5/1989 | Nagaura et al. | 429/194 |
| 5,135,732 | 8/1992 | Barboux et al. | 423/593 |
| 5,147,739 | 9/1992 | Beard | 429/194 |
| 5,196,279 | 3/1993 | Tarascon | 429/194 |
| 5,326,545 | 7/1994 | Koksbang et al. | 423/62 |
| 5,334,334 | 8/1994 | Koksbang | 264/28 |
| 5,418,090 | 5/1995 | Koksbang et al. | 429/224 |
| 5,425,932 | 6/1995 | Tarascon | 423/599 |

FOREIGN PATENT DOCUMENTS

| | | |
|---|---|---|
| 60-225358 | 11/1985 | Japan . |
| 2221213 | 1/1990 | United Kingdom . |

OTHER PUBLICATIONS

J. Farcy, J.P. Pereira–Ramos, L. Hernan, J. Morales, and J.L. Tirado, "Cation–Deficient Mn–Co Spinel Oxides as Electrode Material for Rechargeable Lithium Batteries", Electrochimica Acta, vol. 39, No. 3, 339–345, 1994 no month available.

R.J. Gummow, A. deKock, M.M. Thackeray, "Improved Capacity Retention in Rechargeable 4 V Lithium/Lithium–Manganese Oxide (Spinel) Cells", Solic State Ionics, vol. 69, 1994 no month avialable.

H. Huang and P.G. Bruce, "A 3 Volt Lithium Manganese Oxide Cathode for Rechargeable Lithium Batteries", J. Electrochem. Soc., vol. 141, No. 7, Jul. 1994.

J.M. Tarascon, E. Wang, F.K. Shokoohi, W.R. McKinnon, and S. Colson, "The Spinel Phase of $LiMn_2O_4$ as a Cathode in Secondary Lithium Cells", J. Electrochem. Soc., vol. 138, No. 10, 2859–2864, Oct. 1991.

J.M. Tarascon and D. Guyomard, "Li Metal–Free Rechargeable Batteries Based on $Li_{1+x}Mn_2O_4$ Cathodes ($0 \leq X \leq 1$) and Carbon Anodes", J. Electrochem. Soc., vol. 138, No. 10, 2864–2868, Oct. 1991.

*Primary Examiner*—Kathryn L. Gorgos
*Assistant Examiner*—Edna Wang
*Attorney, Agent, or Firm*—Linda Deschere

[57] ABSTRACT

The present invention provides a method of preparing an intercalation compound of the nominal general formula $Li_xMn_2O_4$, where x is greater than 0 and less than 2, which comprises providing a manganese compound and a lithium compound and mixing such compounds in proportion which provides the desired amount of x demonstrated by the nominal general formula. The mixed compounds are then irradiated with electromagnetic radiation, desirably microwave frequency or infrared radiation whereby manganese, lithium, and oxygen combine to form the $Li_xMn_2O_4$ having the desired quantity x of lithium. It is desired that the heating by radiation be conducted in air. Preferably, the radiation is microwave radiation and such radiation is at a frequency which causes atomic bonds to vibrate within at least a portion of the precursor compounds and/or the solvent contained in the mixture.

21 Claims, 3 Drawing Sheets

METHOD FOR PREPARING LITHIUM MANGANESE OXIDE COMPOUNDS

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells typically include an anode (negative electrode) of metallic lithium, a cathode (positive electrode) typically a transition metal chalcogenide and an electrolyte interposed between spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the electrolyte and then back to the lithium negative electrode.

It has recently been suggested to replace the lithium metal anode with a carbon anode such as coke or graphite which are intercalation compounds. Such negative electrodes are used with lithium containing cathodes, in order to form an $Li_xC$ anode. Such cells, in an initial condition, are not charged. In order to be used to deliver electrochemical energy, such cells must be charged in order to transfer lithium to the carbon from the lithium containing cathode. During discharge the lithium is transferred from the anode back to the cathode. During subsequent recharge, the lithium is transferred back to the anode where it reintercalates into the carbon. Lithium manganese oxide represented by the nominal general formula $Li_xMn_2O_4$ is known to be an intercalation compound usable as a cathode material in a lithium battery. This material has been used as a positive electrode for batteries comprising lithium metal anodes as well as a positive cathode lithium source for lithium ion batteries, for example, comprising intercalation carbon electrodes as anodes.

Methods of synthesis for $Li_xMn_2O_4$ compounds are known and are reactions generally between stoichiometry quantities of a lithium containing compound and a manganese containing compound, exemplified by a lithium salt and manganese oxide. Common precursors are, for example, lithium salt and $MnO_2$ compounds as disclosed by Hunter in U.S. Pat. No. 4,246,253. In U.S. Pat. No. 4,828,834 Nagaura et al. attempted to prepare lithium manganese oxide materials by sintering precursor lithium salt and $MnO_2$ materials. However, Nagaura's nominal $LiMn_2O_4$ compounds were not fully crystallized spinel electrodes and suffered from very low capacity. The methods described by Hunter and Nagaura require a heating time of from about 10 to about 50 hours at temperatures ranging from about 500° C. to about 900° C. Accordingly, present methods for forming lithium manganese oxide, nominally, $LiMn_2O_4$, and more generally, $Li_xMn_2O_4$ pose significant barriers due to the severe penalty of time, controlled process conditions, and other features which do not permit adaptability to automated commercial production.

SUMMARY OF THE INVENTION

The present invention provides a method of preparing an intercalation compound of the nominal general formula $Li_xMn_2O_4$, where x is greater than 0 and less than 2, which comprises providing a manganese compound and a lithium compound and mixing such compounds in proportion which provides the desired amount of x demonstrated by the nominal general formula. The mixed compounds are then irradiated with electromagnetic radiation, desirably microwave frequency or infrared radiation whereby manganese, lithium, and oxygen combine to form the $Li_xMn_2O_4$ having the desired quantity x of lithium. It is desired that the heating by radiation be conducted in air. Preferably, the radiation is microwave radiation and such radiation is at a frequency which causes atomic bonds to vibrate within at least a portion of the precursor compounds and/or the solvent contained in the mixture.

In a preferred embodiment, before heating, the manganese compound and the lithium compound are each in particle form and are essentially homogeneously intermingled in a wet mixture comprising a volatile solvent, the manganese compound, and the lithium compound. The lithium and manganese compounds are suspended in the solvent or dissolved therein. Next, at least a portion of the volatile solvent is removed to provide the manganese compound particles intermingled with and in grain-to-grain contact with particles of the lithium compound. In one embodiment, the solvent is capable of absorbing electromagnetic or microwave radiation and optionally either one of the manganese compound and the lithium compound are also capable of such radiation absorption. In this embodiment, the solvent absorbs the radiation energy necessary for a chemical reaction to occur between the manganese compound and the lithium compound. And, optimally, one or both of the manganese compound and lithium compound also absorb radiation energy necessary to achieve elevated temperature for such reaction. It is preferred that both the manganese compound and the lithium compound be capable of absorbing electromagnetic or microwave radiation for the reaction to proceed most effectively.

It is desired that the lithium compound and the manganese compound be present in an amount which provides the nominal general formula proportion having x in a range of about 0.75 to about 1.25. That is, 0.75 to 1.25 moles of lithium for each 2 moles of manganese in the $Li_xMn_2O_4$ product. Alternatively, the lithium compound and the manganese compound are desirably present in an amount which provides x in a range of about 0.8 to about 1.2. It is preferred that some excess lithium precursor is used to achieve an amount of x greater than 1 in the product $Li_xMn_2O_4$.

In the method of the invention it is desirable to heat by using microwave energy of at least about $10^9$ Hz frequency, and preferably within a range of frequencies of $10^9$ Hz to $10^{11}$ Hz. Advantageously, it is possible to use frequencies characteristic of a household microwave of a type conventionally used by consumers for food preparation. It is preferred to use a 0.6 to 1 kilowatt microwave generator operating at $2 \times 10^9$ to $5 \times 10^9$ hertz corresponding to 15 cm and 6 cm wave length, respectively. In another embodiment, infrared radiation is used at a frequency of $3 \times 10^{11}$ Hz to $4 \times 10^{14}$ Hz corresponding to 0.1 cm and 0.75 micron wave length, respectively. Regardless of the heating method chosen, the intermingled particles of the two compounds are reacted in air at an elevated temperature by raising the temperature of the particles at a rate of at least about 100° C. to about 200° C. per minute until the manganese, lithium, and oxygen combine to form $Li_xMn_2O_4$. It is preferred that the elevated temperature is sufficient to cause the powder of particles to glow red which is characteristic of such powder having reached a temperature of about 600° C. to about 700° C. As in the most preferred embodiment, the elevated temperature is achieved by subjecting the intermingled particles to short electromagnetic wave radiation. It is also possible to use indirect radiant heating by infrared radiation. The powder comprising the intermingled precursor compounds, before heating, appears white in color. After heating to the glowing red temperature, the product powder appears dark grey in color. During the reaction, gases are released as the precursor compounds decompose. After heating, the rate of cooling is not thought to be critical. The product may be cooled under typical room temperature ambient conditions. Cooling may conveniently take place in a microwave cavity, after heating.

Objects, features, and advantages of the invention include an improved electrochemical cell or battery based on lithium which has good charging and discharging characteristics, a large discharge capacity, which maintains its integrity over a prolonged life cycle, and which is able to be produced relatively economically, and relatively easily, and rapidly. Another object is to provide a method for forming cathode active material which lends itself to commercial scale production providing for ease of preparing large quantities.

These and other objects, features, and advantages will become apparent from the following description of the preferred embodiments, claims, and accompanying drawings.

BRIEF DESCRIPTION OF THE DRAWINGS

FIG. 5 contains two parts, 5A and 5B, each of which is an x-ray diffraction analysis obtained by the same method as described in connection with FIG. 4. FIG. 5A repeats the x-ray diffraction analysis show in FIG. 4 for easy comparison to FIG. 5B. FIG. 5B contains an x-ray diffraction analysis of conventional $LiMn_2O_4$ prepared according to conventional techniques from lithium carbonate and manganese oxide.

FIG. 6 is a illustration of a cross-section of a thin battery or cell embodying the invention.

DETAILED DESCRIPTION OF THE PREFERRED EMBODIMENTS

The present invention provides a method of preparing an intercalation compound of the nominal general formula $Li_xMn_2O_4$, where x is greater than 0 and less than 2. In one embodiment, the method comprises providing a manganese compound and a lithium compound at least one of which is capable of absorbing electromagnetic or microwave radiation. The manganese compound and lithium compound are in a proportion which provides the nominal general formula desired within the stated range of x. The precursor compounds are intimately mixed and then irradiated with electromagnetic or microwave frequency radiation, preferably in air, whereby manganese, lithium, and oxygen combine to form the $Li_xMn_2O_4$, x greater than 0 and less than 2. In a preferred embodiment, the method of the invention comprises preparing an intercalation compound of the nominal general formula $Li_xMn_2O_4$ by mixing a manganese compound with a lithium compound where such compounds are in particle form. Before reacting the manganese compound and the lithium compound, the particles are intermingled to form an essentially homogenous powder mixture of the manganese compound and the lithium compound dispersed together in the mixture. In this embodiment, the manganese compound and the lithium compound are each in particle form and are essentially homogeneously intermingled in a wet mixture comprising a volatile solvent, the manganese compound, and the lithium compound. The lithium and manganese compounds are suspended in the solvent or dissolved therein. Next, at least a portion of the volatile solvent is removed to provide the manganese compound particles intermingled with and in grain-to-grain contact with particles of the lithium compound. In one embodiment, the solvent is capable of absorbing electromagnetic or microwave radiation and optionally either one of the manganese compound and the lithium compound are also capable of such radiation absorption. In this embodiment, the solvent absorbs the radiation energy necessary for a chemical reaction to occur between the manganese compound and the lithium compound. And, optimally, one or both of the manganese compound and lithium compound also absorb radiation energy necessary to achieve elevated temperature for such reaction. It is preferred that both the manganese compound and the lithium compound be capable of absorbing electromagnetic or microwave radiation for the reaction to proceed most effectively.

It is desired that the lithium compound and the manganese compound be present in an amount which provides the nominal general formula proportion having x in a range of about 0.75 to about 1.25. That is, 0.75 to 1.25 moles of lithium for each 2 moles of manganese in the $Li_xMn_2O_4$ product. Alternatively, the lithium compound and the manganese compound are desirably present in an amount which provides x in a range of about 0.8 to about 1.2. It is preferred that some excess lithium precursor is used to achieve an amount of x greater than 1 in the product $Li_xMn_2O_4$.

It is preferred that the radiation supplied to initiate and conduct the reaction is microwave radiation. It is preferred that the microwave radiation is at a frequency which causes atomic bonds to vibrate within at least a portion of precursor compound, being manganese compound, lithium compound, or both. It is also preferred that the microwave radiation be at a frequency which causes atomic bonds within any solvent to vibrate. In an alternative embodiment, the radiation is infrared radiation. Those skilled in the art will understand that in the gamut of electromagnetic waves (radiation) the infrared radiation is at a frequency higher than microwaves. Correspondingly, the infrared radiation has a wave length shorter than microwave. Infrared radiation tends to typically be considered within the range of wave length longer than visible but shorter than microwave in wave length. Microwave radiation is considered to be at a wave length shorter than that of radio waves.

In the method of the invention it is desirable to heat by using microwave energy of at least about $10^9$ Hz frequency, and preferably within a range of frequencies of $10^9$ Hz to $10^{11}$ Hz. Advantageously, it is possible to use frequencies characteristic of a household microwave of a type conventionally used by consumers for food preparation. It is desirable to use a 0.6 to 1 kilowatt, and preferably 0.8 kilowatt, microwave generator operating at $2\times10^9$ to $5\times10^9$ hertz corresponding to 15 cm and 6 cm wave length, respectively. In another embodiment, infrared radiation is used at a frequency of $3\times10^{11}$ Hz to $4\times10^{14}$ Hz corresponding to 0.1 cm and 0.75 micron wave length, respectively. Regardless of the heating method chosen, the intermingled particles of the two compounds are reacted in air at an elevated temperature by raising the temperature of the particles at a rate of at least about 100° C. to about 200° C. per minute until the manganese, lithium, and oxygen combine to form $Li_xMn_2O_4$. It is preferred that the elevated temperature is sufficient to cause the powder of particles to glow red which is characteristic of such powder having reached a temperature of about 600° C. to about 700° C. As in the most preferred embodiment, the elevated temperature is achieved by subjecting the intermingled particles to short electromagnetic wave radiation. It is also possible to use infrared radiation from a source which provides a ramp rate in °C./minute which is very high, providing an almost instantaneous heating source. The ramp rate is, desirably, at least about 100° C. (degrees centigrade) per minute. It is preferably on the order of 200° C./min or higher. Such systems are available for rapid thermal anneal (RTA). The powder comprising the intermingled precursor compounds, before heating, appears white in color. After heating to the glowing red temperature, the product powder appears grey in color. During the reaction, gases are released as the precursor compounds decompose. After heating, the rate of cooling is not thought to be critical. The product may be cooled under typical room temperature ambient conditions. Cooling may conveniently take place in the microwave cavity, after heating. It is possible to form pellets of the intermingled precursor compounds, before heating. This is not thought to significantly affect the reaction time, which is already made very short by the intimate, essentially homogeneous intermingling.

The step of removing the solvent is conveniently conducted by spray drying and freeze drying according to conventional means which will be described further below. It is preferred that the precursor manganese compound and the precursor lithium compound be each in particle form. It is desired that the manganese compound be selected from the group consisting of manganese (Mn) acetate of the representative formula $Mn(CH_3COO)_2$, manganese hydroxide ($Mn(OH)_2$), and manganese nitrate ($Mn(NO_3)_2$). It is desired that the lithium compound be selected from the group consisting of lithium acetate ($LiCH_3COO$), lithium hydroxide (LiOH), lithium nitrate ($LiNO_3$), and lithium carbonate ($Li_2CO_3$). Among these, lithium carbonate is the least desired due to its relatively lesser solubility. It is preferred that the manganese precursor be MnOH or manganese acetate, and that the lithium precursor be lithium acetate or $LiNO_3$. The aforesaid precursor compounds are generally crystals, granules, and powders, and are generally referred to as being in particle form. The acetate and nitrate precursors are known to be hygroscopic. Therefore, when measuring out precursor quantities, adjustments may be required to account for retained water in the precursor compounds. The solvent mixture wherein the manganese compound and lithium compound precursor is dissolved and/or suspended, is preferably water. Other solvents to be considered are methanol, acetone, and alkaline solutions. Manganese acetate is soluble in alkaline solutions. Therefore, alkaline solutions could be used as other solvents.

In one embodiment, at least a portion of the solvent is removed by spray drying. Spray drying is preferably conducted using pressure nozzles which cause atomization by forcing the wet mixture under pressure at a high degree of spin through a small orifice. The wet mixture is thereby dispersed into fine droplets and dried by a relatively large volume of hot gases sufficient to evaporate the volatile solvent, thereby providing very fine particles of the precursor lithium compound and the precursor manganese compound intimately and essentially homogeneously mixed. Desirably, the volatile constituent is water and spray drying takes place in an air or argon stream. Argon, or other inert gas inert with respect to the reaction, is thought to be needed to prevent the oxidation of $Mn^{2+}$ to $Mn^{3+}$. The acetate is a $Mn^{2+}$ based material and the reaction or stoichiometry of the initial mixture is based on that. The temperature of the gas, at the outlet of the dryer, is preferably greater than 100° C. The inlet gas stream is at an elevated temperature sufficient to remove a major portion of the water with a reasonable dryer volume, for a desired rate of dry powder production and particle size. Air inlet temperature, atomized droplet size, and gas flow are factors which may be varied and affect the particle size of the spray dried product, and the degree of drying. Typically, there is some water or solvent left in the spray dried material, on the order of about 20 percent to 30 percent by weight water. It depends on the flow rate, residence time of the solvent water particles, and contact with the heated air, and also depends on the temperature of the heated air. Techniques for spray drying are known and a further description of spray drying may be found in U.S. Pat. No. 5,326,545 issued to Koksbang et al which is incorporated herein by reference in its entirety. Freeze drying is an alternative method for drying the precursor solution to remove at least a portion of the solvent. Freeze drying is preferably conducted by cooling the solvent mixture to a temperature below the freezing point of the solvent under a vacuum. In one aspect, freeze drying is conducted under a vacuum and that an absolute pressure of less than 5 millimeters of mercury (mmHg ABS). Preferably, the solvent is water and the temperature at which freeze drying takes place is at about 0° C. or less. Desirably, the temperature is −10° C. or less, and preferably it is in range of about −10° C. to about −40° C. A suitable range is −20° C. to −30° C. The freeze drying removes the volatile solvent under vacuum, thereby providing fine particles of the intermingled manganese precursor compound and the lithium precursor compound. The equipment necessary to accomplish freeze drying depends on the quantity of material being freeze dried. If a flask is used, the wet mixture may be frozen in the flask in a dry ice methanal bath. The solvent (water) is driven off for a sufficient period of time under vacuum using a vacuum pump. The freeze drying is conducted preferably until the moisture content is reduced to less than 30 percent by weight and desirably on the order of less than 10 percent by weight or less. After freeze drying, if it is desired to drive off additional water it is recommended to heat the freeze dried product to a temperature greater than about 100° C. for a time sufficient to reduce the water content to the desired level. Techniques for freeze drying are known and are discussed in U.S. Pat. No. 5,334,334 issued to Koksbang which is incorporated by reference herein in its entirety.

As can be observed from the aforesaid description, one feature of the invention is the fact that the value x in $Li_xMn_2O_4$ can range up to about 2. It is advantageous to achieve a nominal formula of the product $Li_xMn_2O_4$ where x is greater than 1. This provides essentially an excess of lithium in the final product. It is also preferred that the steps of heating be conducted in a microwave to effectively and efficiently obtain a unit-cell parameter of about 8.23 Å for the final product. A unit-cell parameter of up to about 8.23 Å is preferred.

Figure 1:
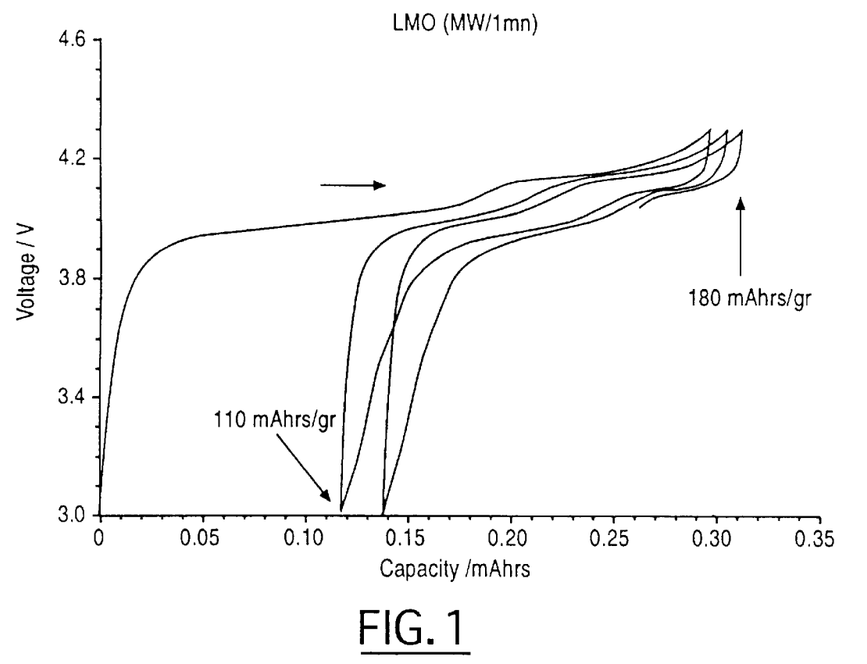
FIG. 1 shows a voltage profile of a test cell, based on the lithium manganese oxide electrode active material prepared according to the invention, and using a lithium metal counter-electrode as described in the Example. The data shown in FIG. 1 is based on the Electrochemical Voltage Spectroscopy (EVS) technique.
Figure 2:
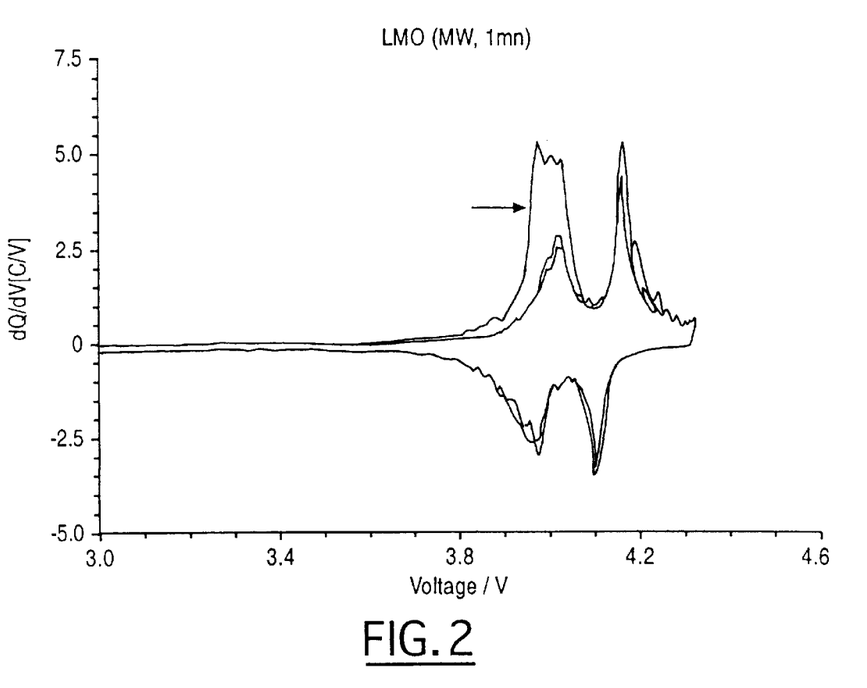
FIG. 2 is an EVS of a differential capacity plot based on FIG. 1.
Figure 3:
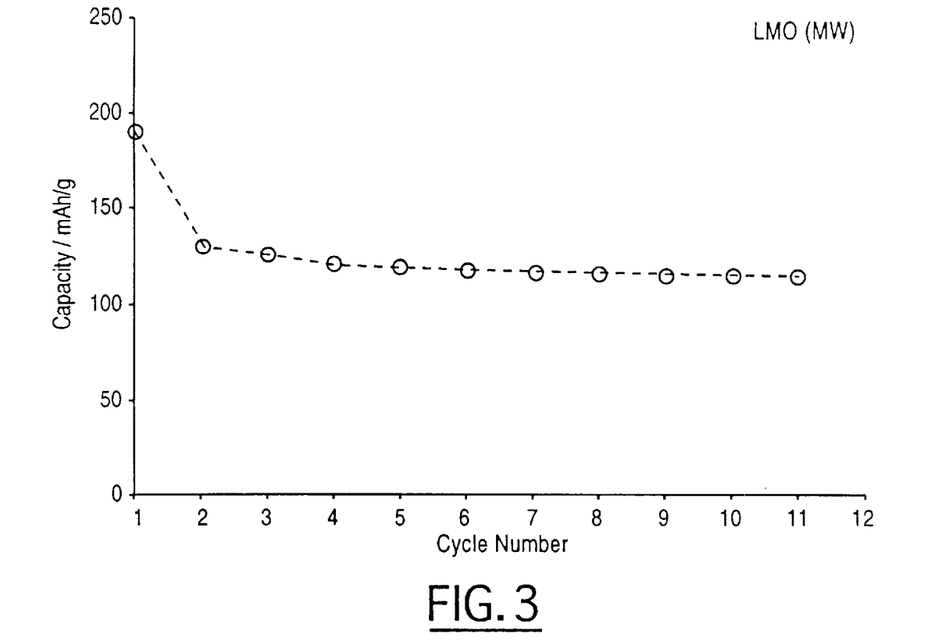
FIG. 3 shows the capacity in milliamp hours and cycling performance of the $Li_xMn_2O_4$ (nominal formula) active material prepared according to the invention.
Figure 4:
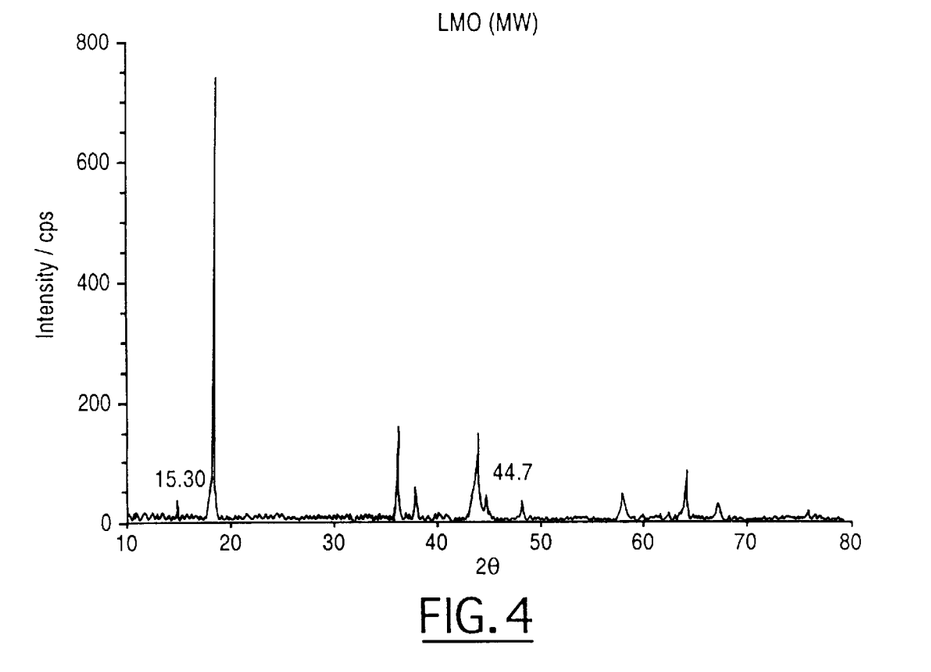
FIG. 4 shows the results of an x-ray diffraction analysis of the nominal $Li_xMn_2O_4$ prepared according to the invention, conducted using CuK αtype radiation.
Figure 5A:
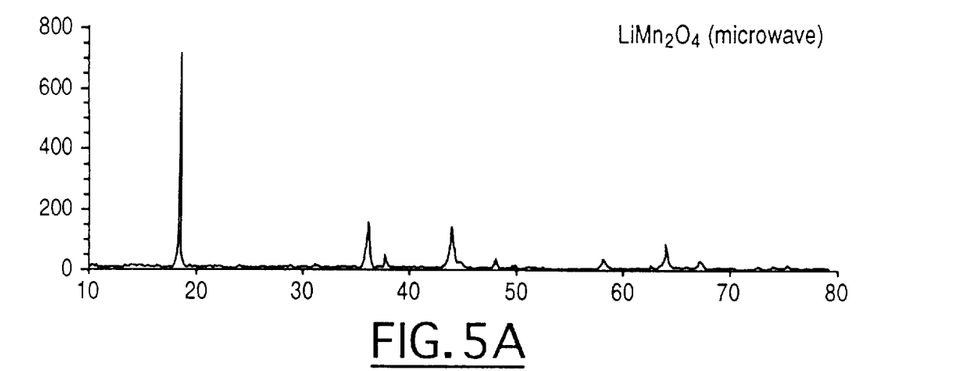
Figure 5B:
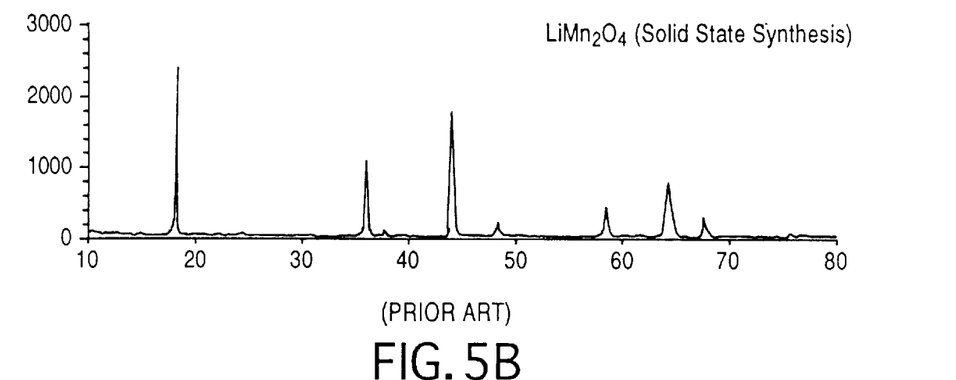

Positive electrode active materials were prepared and tested electrochemically and the results are reported in FIGS. 1 to 3 and features as reported in FIGS. 4 and 5. The test cell configuration will be described with reference to FIG. 6.

A description of the electrochemical cell or battery which uses the novel active material of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 6, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils having a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any ionically conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an tonically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; and 5,037,712. Each of the above patents is incorporated herein by reference in its entirety.

Electrodes of the invention are made by mixing a binder, the active material, and carbon powder (particles of carbon). The binder composition is desirably a binder/electrolyte such as polymeric acrylates (plastics) which are x-linked by radiation curing or may be based on conventional electrolyte/binder systems. The binder/electrolyte is preferably the polymeric acrylate (plastic) with ionic conduction capability. After mixing, the resulting paste, containing the binder, active material, and carbon, is coated onto a current collector, and any polymer content is polymerized, and cross-linked by heat radiation or other curing means.

Positive Electrode

A positive electrode containing the $Li_xMn_2O_4$ active material of the invention is prepared by the following method. For the positive electrode, the content was as follows: 50 to 90 percent by weight active material ($Li_xMn_2O_4$); 5 to 30 percent carbon black as the electric conductive diluence; and 3 to 20 percent binder preferably chosen to enhance ionic conductivity. The stated ranges are not critical. The amount of active material may range from 25 to 85 weight percent. The formation of each electrode will now be described. The positive electrode was prepared from mixtures of lithium-manganese oxide (active material) and EPDM (ethylene propylene diene monomer) as the binder, Shawinigan Black® was used as the carbon powder conductive diluent. The carbon powder conductive diluent is used to enhance electronic conductivity of the lithium-manganese oxide. Shawinigan Black®, available from Chevron Chemical Company, San Ramone, Calif., has a BET average surface area of about 70±5 square meters per gram. Other suitable carbon blacks are sold under the designation Super P™ and Super S™ available from MMM, a subsidiary of Sedema, which carbons have BET surface areas of about 65±5 square meters per gram. (MMM has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the active material $LiMn_2O_4$, the binder (EPDM), and the carbon particles (Shawinigan Black®). These were mixed and blended together with a solvent. Xylene is a suitable solvent. The mixture was then coated onto an aluminum foil current collector to achieve a desired thickness for the final electrode.

Electrolyte

The electrolyte used to form the completed cell was a combination of EC/DMC. That is, ethylene carbonate (EC) and dimethyl carbonate (DMC). The ratio of EC:DMC was about 2:1 by weight. Positive and negative electrodes were maintained in a separated condition using a fiber glass layer. Such separation can also be achieved using a layer of Celgard™. Hoechst-Celanese Corp., Celgard 2400™, porous polypropylene, 25 microns thick.)

Negative Electrode

The electrochemical cell used with the positive electrode and electrolyte may contain one of a variety of negative electrode active materials. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon black, and ionically conductive binder in the proportions as described above for the positive electrode. In a preferred embodiment, the negative electrode active material is graphite particles. For test purposes, for determining capacity of a positive electrode, test cells were fabricated using the lithium metal active material. Accordingly, the cells assembled for testing and the results described hereinbelow are based on the positive electrode active material comprising the $LiMn_yZ_xO_4$ of the invention tested against a lithium metal counter electrode. When forming cells for use as batteries, it is preferred to use a non-metallic intercalation electrode. The preferred negative electrode comprises about 80 to 95 percent by weight graphite particles, and more preferably about 90 percent by weight with the balance constituted by a binder. Preferably, the anode is prepared from a graphite slurry as follows. A polyvinylidene difluoride (PVDF) solution is prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry is prepared by first adding 36 grams of graphite (SFG-15) into about 38.5 grams of the PVDF solution. The mixture is homogenized with a commercial homogenizer or blender. (For example, Tissue Homogenizer System from Cole-Parmer Instrument Co., Niles, Ill.). The viscosity of the slurry is adjusted to about 200 cp with additional PVDF solution. The slurry is coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

Various methods for fabricating electrochemical cells and for forming electrode components are described herein. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

EXAMPLE I

The manganese precursor compound was manganese (II) acetate and the lithium precursor compound was lithium nitrate. Both precursor compounds were in powder form. 24.5 grams of the manganese (II) acetate and 4.33 grams of the lithium nitrate powders were mixed and stirred in about 100 milliliters of water. The acetate and nitrate powders were essentially dissolved in the water as essentially no particles were found in suspension. The aqueous mixture was then spray dried to remove a major portion of the water. The aqueous mixture was pumped through a tube and through the spray drying process using a Yamato™ Mini Spray Dryer, Model ADL-31. The flow rate was adjusted to be 4 milliliters per minute. The spray drying process involved the atomization of the liquid into tiny droplets forming a spray which was dried by hot argon gas to efficiently evaporate moisture (water, solvent) from the atomized particles. The dried particles were blown into a collection jar and accumulated as a fine particle coating inside the jar. The inlet temperature of the hot argon drying gas was approximately 180° C. The collected powder comprised particles of the two precursors comprising the manganese ($Mn^{+2}$) and the lithium ($Li^{+1}$). The resultant collected powder was subjected to microwave radiation in a Litton™ Generation II standard kitchen microwave at its highest setting. The microwave oven was operated in air at room temperature. The quantity of material microwaved was 3 grams of material placed in a 4 ounce quartz jar covered with parafilm and microwaved for 4 to 5 minutes until a red glow appeared signifying a highly exothermic rapid reaction. During microwaving, the powder appeared to glow red indicating that the powder had achieved during microwaving a temperature in a range of about 500° C. to about 700° C. as evidenced by its red appearance. The progress of the reaction may be followed by a color change. The spray dried powder before microwaving was white in appearance. After microwaving, the powder was gray in color. After microwaving, the microwave oven door was opened so that the microwave cavity might cool and gases were evacuated. The rate of cooling was not considered to be critical and the sample was simply permitted to cool after opening the door of the cavity of the oven. It cooled to a point where it could be touched in about 2 to 5 minutes. The equipment for generating microwaves is well known to those skilled in the art as evidenced by success of the process when using a conventional household brand Litton™ Generation II standard kitchen microwave oven. The product was analyzed using atomic absorption analysis which indicated that there was about 1.25 moles of lithium for every 2 moles of manganese, lithium constituted 4.75 percent by weight of the final microwaved material product. Based on the analysis, the product was found to be $Li_xMn_2O_4$, with x equal to 1.25, having a spinel structure.

By subjecting a suspension or solution of precursor compounds in a solvent to microwave radiation in a normal domestic microwave cooking apparatus, very well defined crystalline $Li_xMn_2O_4$ forms within a few minutes. The time required is certainly less than an hour, less than 10 minutes, generally less than 5 minutes, and on the order of 1 to 3 minutes. The improvement in the quality of the crystalline product so formed is exemplified by the x-ray graphs and performance curves which form a part of this disclosure.

The final product obtained after microwaving is an easily friable powder where the individual particles of the powder are very small, on the order of 1 to 2 microns median particle size. The powder product of the invention may be used to form cathode active materials without grinding or with very little grinding due to the advantageously small particle size achieved during the radiation heating. It is thought that during radiation heating, the evolved gases which are released during a reaction cause something similar to a small explosion within the reaction precursor powder which reduces particle size.

Comparative Example

Particles of manganese oxide ($MnO_2$) and lithium nitrate ($LiNO_3$) were mixed. The mixed particles were subjected to microwave radiation in a microwave oven as described in connection with the above Example. No reaction occurred.

EXAMPLE II

The active material $Li_xMn_2O_4$ prepared according to the method of Example I was tested in a test cell. The positive electrode, as tested, comprised the active material at 87 percent by weight; carbon black (Shawanigan Black) 10 percent by weight; and 3 percent by weight EPDM binder. The electrolyte was the EC/DMC with fiber glass as its separator and $LiPF_6$ salt as the electrolyte. The counter electrode was metallic lithium. The current density of the test cell was 180 milliamps per square centimeter. The test cell is based upon 2.4 square centimeter positive electrode with an active material loading of about 5 to 10 milligrams per square centimeter. The capacity was determined under constant current cycling at ±0.2 mA/cm$^2$ at the end of every discharge.

FIG. 1 shows a voltage profile of the test cell, based on the $Li_xMn_2O_4$ (LMO) positive electrode active material of the invention, and using a lithium metal counter electrode as described in the Example. The data shown in FIG. 1 is based on microwaving one minute (MW/1 Mn). The data shown in FIG. 1 is based on the Electrochemical Voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemica Acta, Vol. 40, No. 11, at 1603 (1995). FIG. 1 clearly shows and highlights the very high and unexpected degree of reversibility of the lithium ion reactions of the $Li_xMn_2O_4$ active material of the invention. The positive electrode showed a performance of 110 milliamp hours per gram on the first discharge. FIG. 1 clearly shows and highlights the excess quantity of lithium, x equal to about 1.25, which is in excess of the amount of lithium present in a convention $LiMn_2O_4$ which has x equal to 1. The excess capacity is indicated by the arrow. The excess capacity is evident on first cycle charging when an irreversible quantity of lithium ions is removed from the positive electrode active material $Li_{1.25}Mn_2O_4$ for delivery to the negative electrode. The initial capacity at 180 milliamp hours per gram is greater than the reversible capacity of 150 milliamp hours per gram, with the difference signifying the lithium irreversibly removed constituting the excess capacity. Upon subsequent charge and discharge, the amount of lithium which reversibly reintercalates into the positive electrode $Li_xMn_2O_4$ is thought to be up to about x equals 1.

FIG. 2 is an EVS of a differential capacity plot based on FIG. 1. The excess capacity available from the positive electrode material $Li_{1.25}Mn_2O_4$ is identified by an arrow in FIG. 2. As can be seen from FIG. 2 this excess capacity is irreversible as subsequent symmetrical nature of the peaks show the reversibility on charge and discharge. The one peak related to irreversible reaction is the excess capacity, all other peaks above the axis (cell charge) have corresponding peaks below the axis (cell discharge).

FIG. 3 shows the capacity in milliamp hours of the $Li_{1.25}Mn_2O_4$ active material for the positive electrode. On a weight basis, the active material has an initial capacity of about 180 milliamp hours per gram. This initial capacity is very attractive. After the initial cycle, the $Li_{1.25}Mn_2O_4$ cathode of the invention has excellent rechargeability on the order of about 110 milliamp hours per gram with the difference (180–110) constituting the excess capacity, lithium ions advantageously available for delivery to the negative electrode. FIG. 3 shows the excellent cycling and capacity of cell. The capacity was determined at the constant current cycling, for cycles 1 to 11; with a voltage range of 3.0 to 4.3 volts. As shown in FIG. 3, after up to 11 cycles, the capacity remains high at about 125 milliamp hours per gram. This performance is very attractive when compared to conventional $LiMn_2O_4$. The theoretical capacity of conventional $Li_1Mn_2O_4$ is about 150 milliamp hours per gram and the actual reversible capacity is equal to only 120 to 130 milliamp hours per gram. As shown by FIGS. 1 and 3 the reversible capacity of the $Li_xMn_2O_4$ of the invention is on the order of about 100 to about 130 and averaged on the order of 120 for all samples prepared. Thus, the reversible capacity of the $Li_xMn_2O_4$ of the invention is greater than that of the conventional $Li_1Mn_2O_4$. In addition, the $Li_xMn_2O_4$ of the invention has an initial excess capacity with lithium greater than 1. This is not present in conventional $Li_1Mn_2O_4$.

FIG. 4 shows the results of an x-ray diffraction analysis of the nominal general formula $Li_xMn_2O_4$, x equals about 1.25, prepared according to the invention. The x-ray diffraction was conducted using CuKα type radiation. The diffraction analysis shown in FIG. 4 is nearly identical to conventional $Li_1Mn_2O_4$ except for the presence of some impurities and the additional (excess) lithium. This indicates that the structure of the novel $Li_xMn_2O_4$, x greater than 1, of the invention is similar to, and essentially identical to, the basic spinel structure of conventional $Li_1Mn_2O_4$. This is advantageous because the spinel structure is known to reversibly intercalate lithium at a higher rate compared, for example, to tetragonal $Li_{1+x}Mn_2O_4$. In contrast, it would have been expected that the product of the invention could have obtained a tetragonal structure which was not observed. Referring to FIG. 5, one can further observe evidence demonstrating the similarities of the $Li_xMn_2O_4$, x equals 1.25, and conventional $Li_1Mn_2O_4$. FIG. 5 contains two parts, FIGS. 5A and 5B, each of which is an x-ray diffraction analysis obtained by the same method as described in connection with FIG. 4. FIG. 5 repeats the x-ray diffraction analysis shown in FIG. 4 for easy comparison to FIG. 5B. FIG. 5B contains an x-ray diffraction analysis of conventional $Li_1Mn_2O_4$ prepared according to conventional techniques, as follows: $Li_2CO_3$ and $MnO_2$ (EMD) were intimately mixed together and pellets made from the mixture. The pellets were heated in air at a rate of 2° C./Mn up to 800° C. for 24 hours. After slowly cooling down to room temperature, the pellets were crushed and pelletized again and the whole heating step repeated for a further 24 hours. As can be seen by comparing FIGS. 5A and 5B, the product of the invention is essentially the same as conventional $LiMn_2O_4$ except that the product of the invention has excess lithium in its spinel structure. The a-axis parameter of the spinel product of the invention $Li_xMn_2O_4$ is about 8.23 Å. This further demonstrates its similarity to conventional $Li_1Mn_2O_4$. An a-axis parameter of up to about 8.23 Å is thought to provide operational advantages in an electrochemical cell. Advantageously, the invention product shows the same x-ray pattern even after a week. This demonstrates its stability as a spinel. An added advantage is that it is less hygroscopic compared to the conventional $LiMn_2O_4$.

While not wishing to be held to any particular theory, it is believed that the microwave action of the present invention induces significant vibration in particular molecular or atomic bonds which accelerates and enhances the reaction. Improvements arising out of the present technique include the reduction of time in conducting the reaction, a greater measure of control of the reaction product, and a reduced chance of ignition during formation of the product which ignition would result in its premature destruction. It is thought that the radiant, microwave synthesis method of the invention occurs at a lower temperature than would occur using conventional connective, or conductive heating means. It is also thought that coordination of C—O—Mn—O—C bonds in Mn acetate leads to the desired coordination of Mn—O bonds in the Li$_x$Mn$_2$O$_4$ product. In the case of Example I, described above, the reactions involved are thought to be exemplified by the following chemical equations. The spray dried material is a mixture of LiNO$_3$ and Mn(OAc)(OH) when reacted:

It is difficult to analyze the intermediate products because of the short time of the reaction. It is thought that the lithium nitrate (LiNO$_3$) melts first and then essentially gets distributed around the manganese compound particles. Consequently, the above mentioned conversion reaction is considerably promoted under the action of microwaves. The rapid rate at which the reaction proceeds and the good structure of the product as demonstrated by x-ray diffraction indicates and tends to prove that the process in accordance with the invention makes it possible to optimize and control the reactions accompanying the formation of the Li$_x$Mn$_2$O$_4$ product. In contrast, the lack of reaction for the Comparative Example demonstrates that the type of precursor, particularly the type of manganese precursor compound is required to have specific characteristics in order to successfully obtain high temperature reaction in a short time interval via radiant heating.

The significant advantages of the invention may be further understood by contrasting it with the method of Tarascon. In U.S. Pat. No. 5,425,932, Tarascon describes using a precursor lithium salt and MnO$_2$ to from Li$_x$Mn$_2$O$_4$ similar to Hunter and Nagaura. In Tarascon the precursors are heated in air to a temperature of in excess of about 800° C. for a time sufficient to achieve crystallization. In Tarascon the heating takes place for about 72 hours, or 3 days. Thus, Tarascon's heating time is much greater than Hunter and Nagaura, and is very time consuming. Tarascon also differs from Hunter and Nagaura in that the cooling rate after said heating is strictly controlled. That is, after heating to a temperature in excess of about 800° C., the resultant mixture is cooled to at least about 500° C. at a controlled rate of less than about 10° C. per hour and preferably 2° C. to 3° C. per hour. This means that in order to achieve at least a 300° C. temperature drop at a rate of 10° C. per hour, 30 hours of cooling time are required. At the preferred rate of 2 C. to 3° C. per hour, as described in Tarascon's examples, the 300° C. temperature drop occurs over a period of 100 to 150 hours. Therefore, Tarascon's preferred procedure requires cooling over a period of 4 days to over 6 days. When coupled with the required heating period of time of 3 days, it can be seen that the process for forming lithium manganese oxide according to Tarascon requires a time of over 7 days to over 9 days. The difference between Tarascon's 7 to 9 days process time and the few minutes process time of the present invention are very dramatic. It is clear that the present invention overcomes significant barriers due to severe penalty of time and barriers due to strict process control over such long time periods. The present invention, alone, is readily adaptable to automated commercial production.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

I claim:

1. A method of preparing an intercalation spinel compound of the nominal general formula Li$_x$Mn$_2$O$_4$, 0<x<2, which comprises:

a. providing a manganese compound and a lithium compound, at least one of said compounds absorbs electromagnetic or microwave radiation;

b. mixing said manganese compound with said lithium compound in proportion which provides said nominal general formula proportion of lithium and manganese; and c. heating said mixed compounds to a temperature of at least about 500° C. by irradiating said mixed compounds with electromagnetic or microwave frequency radiation to form said Li$_x$Mn$_2$O$_4$.

2. The method according to claim 1 wherein x is in a range of about 0.75 to about 1.25.

3. The method according to claim 1 wherein x is in a range of about 0.8 to about 1.2.

4. The method according to claim 1 wherein said radiation is microwave radiation.

5. The method according to claim 4 wherein said microwave radiation is at a frequency which causes atomic bonds to vibrate within at least a portion of said compounds.

6. The method according to claim 1 wherein said radiation is infrared radiation.

7. The method according to claim 1 wherein said manganese compound and said lithium compound are each salts and in particle form, and wherein said mixing step comprises:

i. forming a wet mixture comprising a volatile solvent, said manganese salt compound, and said lithium salt compound; and ii. removing at least a portion of the volatile solvent to provide manganese salt compound particles intermingled with and in grain-to-grain contact with particles of said lithium salt compound.

8. The method according to claim 7 wherein said step of removing said solvent is conducted by spray drying.

9. The method according to claim 7 wherein said step of removing said solvent is conducted by freeze drying.

10. A method of preparing an intercalation compound of the nominal general formula Li$_x$Mn$_2$O$_4$, 0<x<2, which comprises:

a. forming a solution comprising a solvent, particles of a manganese compound, and particles of a lithium compound, said compounds are present in a proportion which provides said nominal general formula, said manganese compound selected from the group consisting of manganese acetate, manganese hydroxide, and manganese nitrate, and said lithium compound selected from the group consisting of lithium acetate, lithium hydroxide, lithium nitrate, and lithium carbonate;

b. removing at least a portion of the solvent to provide said manganese compound particles intermingled with and in grain-to-grain contact with said lithium compound particles; and c. reacting said intermingled particles in a environment which comprises oxygen, at an elevated temperature of at least about 500° C., by penetrating said particles with microwave radiation to form said Li$_x$Mn$_2$O$_4$.

11. A method of preparing an intercalation compound of the nominal general formula Li$_x$Mn$_2$O$_4$, 0<x<2, which comprises:

a. mixing a manganese compound with a lithium compound in proportion which provides said nominal general formula; and b. reacting said mixed particles in an environment which comprises oxygen, by raising the temperature of said particles at a rate of at least about 100° C. per minute to an elevated temperature of about 600° C. to about 700° C. until manganese, lithium, and oxygen combine to form $Li_xMn_2O_4$ where x varies from about 0.8 to about 1.2, by subjecting said particles to short electromagnetic wave radiation in air.

12. The method according to claim 11 wherein said radiation is microwave radiation in a range of $10^9$ Hz to $10^{11}$ Hz.

13. The method according to claim 11 wherein said radiation is microwave radiation in a range of 0.3 cm wave length to 30 cm wavelength.

14. A method of preparing an intercalation compound of the nominal general formula $Li_xMn_2O_4$, 0<x<2, which comprises:

a. mixing a manganese compound with a lithium compound in proportion which provides said nominal general formula; and b. reacting said mixed particles in an environment which comprises oxygen, at an elevated temperature, by raising the temperature of said particles at a rate of at least about 100° C. per minute until manganese, lithium, and oxygen combine to form $Li_xMn_2O_4$ where x varies from about 0.8 to about 1.2, by directing infrared radiation onto said particles.

15. The method according to claim 11 or 14 wherein x is in a range of about 0.75 to about 1.25.

16. The method according to claim 11 or 14 wherein x is in a range of about 0.8 to about 1.2.

17. The method according to claim 11 or 14 wherein said elevated temperature is sufficient to cause said particles to glow red.

18. The method according to claim 14 wherein said infrared radiation is in a range of $3\times10^{11}$ Hz to $4\times10^{14}$ Hz.

19. The method according to claim 14 wherein said infrared radiation is in a range of 0.75 micron wavelength to $10^3$ microns wavelength.

20. The method according to claim 11 or 14 wherein said rate is at least about 200° C. per minute.

21. A method of preparing an intercalation compound of the nominal general formula $Li_xMn_2O_4$, 0<x<2, which comprises:

a. providing a manganese compound and a lithium compound, at least one of said compounds absorbs electromagnetic or microwave radiation;

b. mixing said manganese compound with said lithium compound in proportion which provides said nominal general formula proportion of lithium and manganese; and c. irradiating said mixed compounds with infrared radiation to form said $Li_xMn_2O_4$.

* * * * *